UNITED STATES PATENT OFFICE.

JAMES F. O'SHAUGHNESSY, OF NEW YORK, N. Y.

TREATMENT OF COTTON-SEED.

SPECIFICATION forming part of Letters Patent No. 286,553, dated October 9, 1883.

Application filed August 29, 1883. (No specimens.)

*To all whom it may concern:*

Be it known that I, JAMES F. O'SHAUGHNESSY, of New York, in the county of New York and State of New York, have invented a new and useful Improvement in Treatment of Cotton-Seed; and I do hereby declare that the following is a full, clear, and exact description of the same.

My invention relates to treatment of cotton-seed in order to separate the adhering fiber from the hull and kernel, for the purpose of saving the fiber and obtaining the hull and kernel in a suitable commercial form. I take the cotton-seed as it comes from the cotton-gin with the fiber adhering to the hull and operate upon it without preliminary treatment. In the treatment of seed in this condition as heretofore practically carried on it has been customary for the greater part to crush or break the seed and remove the kernel for use in producing the oil, or as meal for cattle, or both, leaving the hull or shell, with its adhering fiber, as a refuse to be thrown away or to be burned as fuel. In crushing also, or in grinding, a considerable percentage of the crushed kernel adheres to the shell or fiber and is lost. All this occasions a practical loss of about half the value of the material of the cotton-seed, and the meal obtained therefrom by this process, being pure kernel without any of the hull, is too rich to be given by itself as food for cattle on account of its tendency to scour the cattle fed upon it. This ordinary process has been improved by the method of treating the crude seed with acid, whereby the fiber is dissolved and removed, together with more or less of the outer hull, leaving a solid, hard shell inclosing the kernel. This shell may be cracked or ground with the kernel. This process is a practical, successful one, and a great improvement upon those preceding it; but my purpose is to avoid the use of acids and to save for the mechanical purposes for which it is valuable the cotton fiber adhering to the seed; and I also aim to secure at the same time the mixture of the pulverized hull (freed from fiber) with the kernel, whereby it is greatly improved for feeding the cattle.

To this end my invention consists in grinding or crushing in a suitable mill the cotton-seed as it comes from the gin, reducing it to a sufficiently-fine condition, and then sifting out of the pulverized or comminuted mixture, all the cotton fiber leaving the hull and kernel in a condition fit to be pressed for the extraction of the oil or to be fed to the cattle. It is necessary that the seed and adhering cotton should be ground to such a condition that the fiber may be practically sifted out, and it will take with it ordinarily small proportions of the outer hull of the seed. This does not interfere with the utility of the fiber for any of the purposes for which it is intended.

In carrying out my invention I use a mill adapted to cut fiber and the seed and to comminute the whole. For this purpose any of the iron grinding-mills having opposing teeth will serve the purpose. I may use for this purpose a machine such as that shown in the patent of W. D. Wilson, No. 12,977, of 1855, or patent of Dodson, granted March 27, 1883. Having thus reduced the seed and ground the cotton to a sufficient pulverulent condition, I pass it through sieves, which remove all the cotton fiber and leave the pulverized grain and hull. The cotton fiber, with or without portions of the outer shell or hull, is useful for making paper and for almost any of the purposes for which waste cotton is used.

I claim as my invention—

The hereinbefore-described process of reducing cotton-seed and separating the fiber from the hull and kernel, consisting in, first, grinding in a suitable mill the seed and adhering fiber; then separating the fiber from the ground hull and kernel, as and for the purpose set forth.

In testimony whereof I have signed my name to this specification in the presence of two subscribing witnesses.

JAMES F. O'SHAUGHNESSY.

Witnesses:
WILLIAM F. MOORE,
JOHN R. DUNN.